July 5, 1927.  
J. M. LOSACK  
WELL STRAINER  
Filed Dec. 31 1926
1,634,547
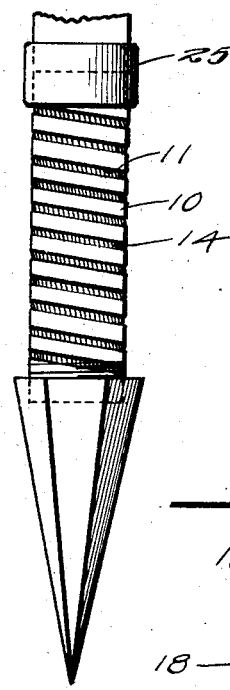
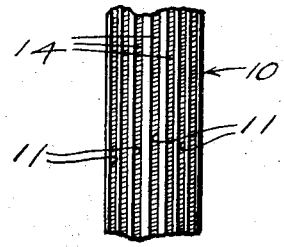
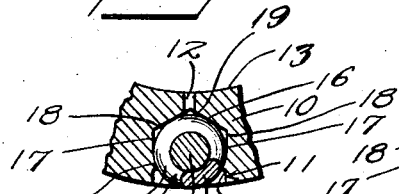
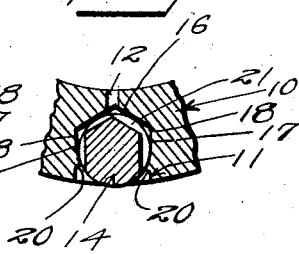
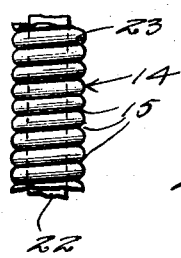
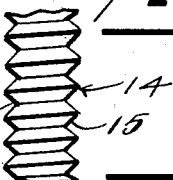
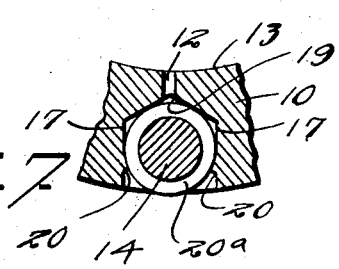
Inventor  
J. M. Losack  
By Watson E. Coleman  
Attorney Patented July 5, 1927.

1,634,547

UNITED STATES PATENT OFFICE.

JOHN M. LOSACK, OF ORCHARD, TEXAS.

WELL STRAINER.

Application filed December 31, 1926. Serial No. 158,278.

This invention relates to well strainers and has for an important object thereof the provision of a well strainer element which may be carried in stock and employed in the construction of well strainers.

A further object of the invention is to provide a novel and improved strainer section of well strainers so constructed that when the strainer is inserted into or is withdrawn from the well, no damage will be caused thereto.

A still further object of the invention is the provision of a well strainer of this character wherein the fluid entering the fluid passage of the strainer through which it is conducted to the surface is subjected to a plurality of straining operations.

A further object of the invention is to provide a device of this character which may be readily and cheaply constructed, which will be durable and efficient in service and a general improvement in the art.

These and other objects I attain by the construction shown in the accompanying drawings, wherein for the purpose of illustration is shown a preferred embodiment of my invention and wherein:—

Figure 1 is a side elevation of a well strainer embodying a strainer unit constructed in accordance with my invention;

Figure 2 is a fragmentary side elevation of a slightly modified strainer unit;

Figure 3 is an enlarged sectional view taken through a portion of the unit with one of the grooves and the strainer unit therein;

Figure 4 is a fragmentary side elevation of one form of strainer unit;

Figure is a similar view of a second form of strainer unit;

Figures 6 and 7 illustrate modified forms of strainer units in position within the grooves.

Referring now more particularly to the drawings, the strainer element consists generally of a tubular body 10 having a groove or grooves 11 formed in the outer wall thereof. Where a single groove is employed, this groove will extend spirally of the body, as shown in Figure 1, while if a plurality of grooves are employed, these grooves preferably extend longitudinally of the body, as indicated. The bottoms of these grooves are in communication through small ports 12 with the interior passage 13 of the body. Arranged within the groove is an element 14, the periphery of which is preferably provided with a spiral groove 15. The element has an external diameter such that it contacts with the side walls of the groove and should preferably be forced into position. The bottom wall 16 of the groove is preferably V-shaped, so that the central portions of the arms of the V will likewise contact with the walls of the element 14. At the junction of the side walls 17 of the groove with the bottom and at the junction of the arms of the V-shaped bottom of the groove, ducts 18 and 19 are formed, the duct 19 being in communication with the interior passage of the body 10 through the ports 12. The walls of the body at the edges of the grooves may be swedged by rolling, as indicated at 20, to prevent escape of the body 14 from the groove. It will be obvious that the groove in the walls of the body, where the walls of this body contact with the walls of the groove, will form minute passages through which fluid may pass first to the ducts 18 and from there to the ducts 19 and so through the ports 12 to the interior passage 13, and the fluid is thus subjected to a dual straining operation in its passage to the interior of the body 10. While the use of a spiral groove is preferred, if desired, the body may be provided with a plurality of circumferentially extending grooves, as indicated at 20ª in Figure 7, or this body may be grooved only at those points which actually contact the walls of the groove, as indicated at 21 in Figure 6. The spiral groove is, however, preferred in that it enables the strainer element to be more readily produced. This spiral groove may be produced in a number of fashions. In Figure 4, I have shown a central core 22 about which is wound a wire 23 of small diameter, the coils of the wire contacting with one another. In Figure 5 a spiral groove has been produced by threading the body, as indicated at 24.

It will be obvious that a device of this character may be made up in lengths and a desired length cut off and employed in the formation of the well strainer by the well supply house. By the use of proper couplings 25, this strainer may be connected with any type of well point or in series with any desired type of tubing.

Since the construction hereinbefore set forth is capable of a certain range of change and modification without materially departing from the spirit of the invention, I do not limit myself to such specific structure except as hereinafter claimed.

I claim:—

1. A well strainer comprising a body having an interior passage and a groove in its outer wall, the bottom of the groove being in communication with the passage and a member wholly within the groove contacting the wall thereof at a plurality of points, at least one of the wall contacting portions of the member having grooves placing the bottom of the groove of the body in communication with the exterior of the body.

2. A well strainer comprising a body having an interior passage and a groove in its outer wall, the bottom of the groove being in communication with the passage and a member wholly within the groove contacting the wall thereof at a plurality of points, the wall contacting portions of the member having grooves placing the bottom of the groove of the body in communication with the exterior of the body.

3. A well strainer comprising a body having an interior passage and a groove in its outer wall, the bottom of the groove being in communication with the passage and a member wholly within the groove contacting the wall thereof at a plurality of points, at least one of the wall contacting portions of the member having grooves placing the bottom of the grooves of the body in communication with the exterior of the body, the bottom wall of the groove of the body and said member combining to produce a duct extending longitudinally of the groove.

4. A well strainer comprising a body having an interior passage and a groove in its outer wall, the bottom of the groove being in communication with the passage and a member wholly within the groove contacting the wall thereof at a plurality of points, the wall contacting portions of the member having grooves placing the bottom of the groove of the body in communication with the exterior of the body, the bottom wall of the groove of the body and said member combining to produce a duct extending longitudinally of the groove.

5. A well strainer comprising a body having an interior passage and a groove in its outer wall, the bottom of the groove being in communication with the passage and a member wholly within the groove contacting the wall thereof at a plurality of points, the wall contacting portions of the member having grooves placing the bottom of the groove of the body in communication with the exterior of the body, the bottom wall of the groove of the body and said member combining to produce a duct extending longitudinally of the groove, the member having a plurality of wall contacting portions at each side of said duct.

6. A well strainer comprising a body having an interior passage and a groove in its outer wall, the bottom of the groove being in communication with the passage and a member within the groove contacting the wall thereof at a plurality of points, at least one of the wall contacting portions of the member having grooves placing the bottom of the groove of the body in communication with the exterior of the body, the body being swedged at the edges of the groove to retain the member within the groove.

7. A well strainer comprising a body having an interior passage and having a groove in its outer wall, a member fitted in the groove and contacting the side walls thereof, said member being formed with a spiral groove, the bottom of the groove being in communication with the interior passage of the body.

8. A well strainer comprising a body having an interior passage and having a groove in its outer wall and a strainer element wholly within the groove comprising a central core about which a fine wire is wound, the coils of the wire contacting with one another, the outer faces of the coils of the wire contacting with the side walls of the groove, the bottom of the groove being in communication with the interior passage of the body.

9. A well strainer comprising a body having an interior passage and having a groove in its outer wall and a strainer element within the groove comprising a central core about which a fine wire is wound, the coils of the wire contacting with one another, the outer faces of the coils of the wire contacting with the side walls of the groove, the bottom of the groove being in communication with the interior passage of the body at its center, the bottom of said groove being V-shaped, each arm of the bottom of the groove contacting the outer faces of the coils of the wire intermediate the ends thereof.

In testimony whereof I hereunto affix my signature.

JOHN M. LOSACK.